United States Patent [19]

Kokaji

[11] Patent Number: 4,513,326
[45] Date of Patent: Apr. 23, 1985

[54] MAGNETIC PRINTING MACHINE EMPLOYING A MULTI-CHANNEL RECORDING HEAD WITH MINIMAL CROSS-TALK WITH SECONDARY SCANNING HEAD MOVEMENT

[75] Inventor: Norio Kokaji, Tokyo, Japan

[73] Assignee: Iwatsu Electric Co., Ltd., Tokyo, Japan

[21] Appl. No.: 414,799

[22] Filed: Sep. 3, 1982

Related U.S. Application Data

[63] Continuation of Ser. No. 141,162, Apr. 17, 1980, abandoned.

[30] Foreign Application Priority Data

Apr. 20, 1979 [JP] Japan .................................. 54-48844

[51] Int. Cl.$^3$ ............................................. H04N 1/24
[52] U.S. Cl. .................................. 358/301; 346/74.5
[58] Field of Search ...................... 358/296, 298, 301; 346/74.2, 74.5

[56] References Cited

U.S. PATENT DOCUMENTS

| | | | |
|---|---|---|---|
| 3,852,525 | 12/1974 | Ichioka et al. | 358/301 |
| 4,072,957 | 2/1978 | Kokaji et al. | 346/74.5 |
| 4,161,738 | 7/1979 | Kokaji | 358/301 |
| 4,163,979 | 8/1979 | Kokaji | 358/301 |
| 4,199,784 | 4/1980 | Wellendorf et al. | 358/298 |
| 4,247,842 | 1/1981 | Wada | 358/301 |
| 4,255,767 | 3/1981 | Frey | 358/301 |
| 4,264,932 | 4/1981 | Minamibayashi et al. | 358/298 |

*Primary Examiner*—Raymond F. Cardillo, Jr.
*Attorney, Agent, or Firm*—Woodcock Washburn Kurtz Mackiewicz & Norris

[57] ABSTRACT

In a magnetic duplicator using a magnetic printing machine, reflected light from a document is converted into an electrical video signal by a photoelectric converting element, and the electrical video signal is supplied to plural channels of the magnetic recording head to form a magnetic latent image on a magnetic recording drum, in the latent image forming mode. In the copy mode, the magnetic latent image is developed by a magnetic toner, and the toner picture is transferred onto a recording paper which runs through a paper transport path. The transferred toner picture is fixed on the recording paper, and the remaining toner on the surface of the magnetic recording drum is cleaned after the transfer operation. When the magnetic latent image is formed on the recording drum, the plural channels of the magnetic recording head are moved along the axial direction of the recording drum. In the movement, a relative movement between the magnetic recording drum and the magnetic recording head in the peripheral direction of the magnetic recording drum is effected as the primary scanning, and a relative movement between the magnetic recording drum and the magnetic recording head along the axial direction of the magnetic recording drum is effected as the secondary scanning. The plural channels of the magnetic recording head are arranged with a track pitch i.e., distance apart, which is a predetermined multiple of one unit distance of the secondary scanning i.e., the distance of one pitch of the secondary scanning. And there is provided a control circuit for effecting the secondary scanning so that the spacing between loci of the channels of the magnetic recording head formed on the magnetic recording drum by the previous primary scanning is filled with loci of the channels of the magnetic recording head formed on the magnetic recording drum by the subsequent primary scanning, and processing the video signals in accordance with the secondary scanning.

11 Claims, 14 Drawing Figures

MAGNETIC PRINTING MACHINE EMPLOYING A MULTI-CHANNEL RECORDING HEAD WITH MINIMAL CROSS-TALK WITH SECONDARY SCANNING HEAD MOVEMENT

This is a continuation of application Ser. No. 141,162, filed Apr. 17, 1980, now abandoned.

BACKGROUND OF THE INVENTION

1. Field of the Invention

This invention relates to a magnetic latent image scanning device for a magnetic printing machine which includes a rotary magnetic recording drum, and magnetic recording head arranged to be moved along the axial direction of the magnetic recording drum and fed with video signals to be processed. The relative movement between the magnetic recording drum and the magnetic recording head in the peripheral direction of the magnetic recording drum constitutes the primary scanning, while the relative movement between the magnetic recording drum and the magnetic recording head along the axial direction of the magnetic recording drum constitutes the secondary scanning. This invention is directed to a magnetic printing machine most suitably applied to a magnetic copying machine in which video signals obtained by image pickup from a document are recorded as the latent image on the recording drum by the magnetic head, and the latent image is developed, transferred and fixed for obtaining a copy. Thus, more particularly, the a magnetic printing machine is most suitably applicable to a record portion of the magnetic duplicator by which numerous copies can be automatically and speedily obtained from one document.

2. Description of the Prior Art

A magnetic copying machine is known, in which video signals obtained by image pickup from a document are recorded as a magnetic latent image on a recording drum by a magnetic head.

In the magnetic copying machine or particularly in a magnetic duplicator by which numerous copies can be obtained rapidly, the rotational speed of the recording drum should be increased, and a multichannel head should be used, in order to shorten the time taken to form the latent image. However, when a multichannel head is used, there is a problem with cross talk between channels. Accordingly, the spacing between the adjacent tracks is limited to a certain value.

I have proposed a recording head mechanism to solve the above problem, as shown in the U.S. Pat. No. 4,072,957. In the recording head mechanism, plural channels are arranged in the axial direction of the recording drum, shifted from each other in the peripheral direction of the recording drum. In such a manner, the spacing between the channels is increased to some extent, although the spacing between the scanning loci of the heads is small. Such an arrangement is suitable for recording alphanumeric and Japanese "kana" syllabary figures, on say a, 9×7 dot matrix. However, when a high resolving power such as about 10 lines/mm is required as in a magnetic duplicator or a Chinese character printer, the above arrangement becomes complicated. The mechanism is expensive, and requires numerous adjusting steps.

SUMMARY OF THE INVENTION

An object of this invention is to provide a magnetic printing machine in which there is no cross talk, and which has high resolving power.

Another object of this invention is to provide a magnetic printing machine in which magnetic latent image can be recorded at a high speed.

A further object of this invention is to provide a magnetic printing machine which is relatively simple in structure so that the machanism is inexpensive and requires fewer adjusting steps than the aforesaid known mechanism.

In accordance with an aspect of this invention, a magnetic latent image scanning device for a magnetic printing machine which includes a rotary magnetic recording drum, and a magnetic recording head arranged to be moved along the axial direction of the magnetic recording drum and fed with video signals to be processed, and in which a relative movement between the magnetic recording drum and the magnetic recording head in the peripheral direction of the magnetic recording drum is effected as the primary scanning, and a relative movement between the magnetic recording drum and the magnetic recording head along the axial direction of the magnetic recording drum is effected as secondary scanning; comprises (A) a plurality of channels arranged in a track pitch of a multiple of one unit distance of the secondary scanning defined by the distance of one pitch by the secondary scanning to be scanned in the direction of the secondary scanning with said magnetic heads; and (B) control means for effecting the secondary scanning so that the spacing between loci of the channels formed on the magnetic recording drum by the previous primary scanning is filled with loci of the channels formed on the magnetic recording drum by the subsequent primary scanning, and processing the video signals in accordance with the secondary scanning.

Various other objects, advantages and features of the present invention will become readily apparent from the ensuing detailed description, and the novel features will be particularly pointed out in the appended claims.

DESCRIPTION OF CERTAIN PREFERRED EMBODIMENTS

Figure 1A:
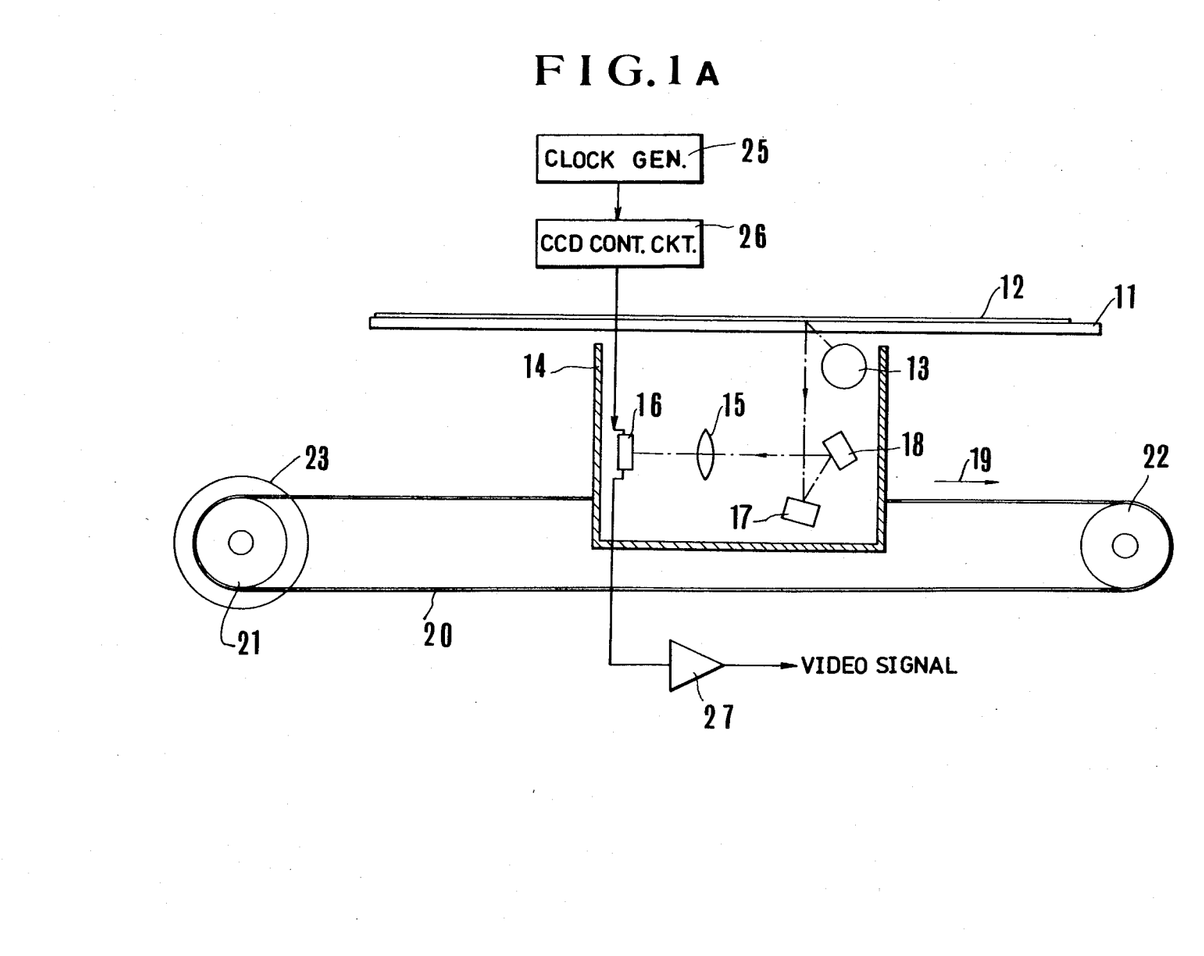
FIG. 1A is a schematic partly cross-sectional side view of an image pickup portion of one embodiment of a magnetic duplicator to which a magnetic printing machine of this invention is applied.
Figure 1B:
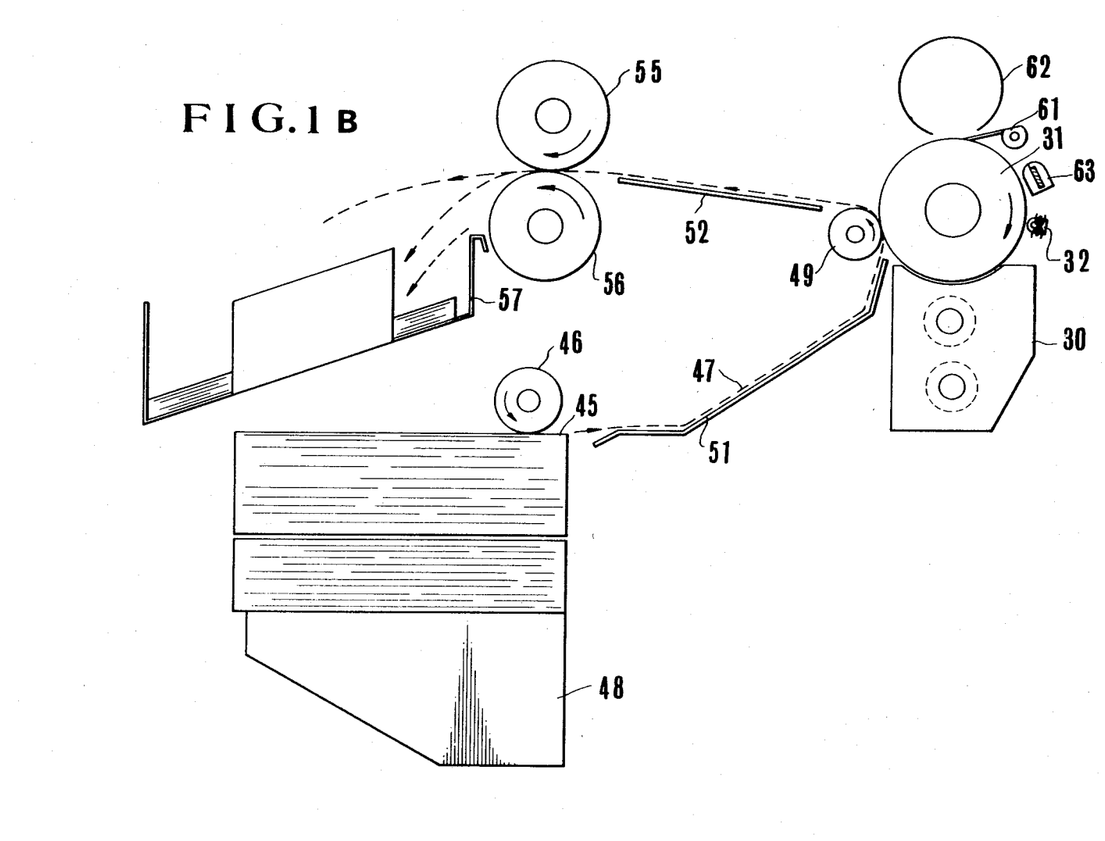
FIG. 1B is a schematic side view of a record portion of the magnetic duplicator of FIG. 1A.
Figure 2:
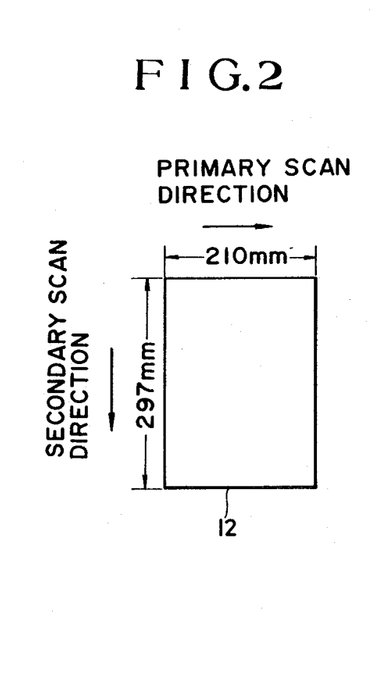
FIG. 2 is a plan view of a document, in which scanning directions of the document in the image pick-up portion of FIG. 1A are shown.

FIG. 1A to FIG. 3 show the principle of one embodiment of a magnetic duplicator to which a magnetic printing machine of this invention will be applied. FIG. 1A shows an image pick-up portion of the duplicator. In FIG. 1A, an original copy, a drawing or a document 12 as shown in FIG. 2 is supported face down on a document support 11 which comprises a transparent (e.g., glass) uniform plate. A part of the document 12 is irradiated by a light source 13 such as a fluorescent lamp which extends in the direction normal to the surface of the drawing of FIG. 1A. Light from the light source 13 is reflected by the surface of the document 12, further by mirrors 17 and 18 and converged onto a photoelectric conversion element or an image pick-up element 16 such as a CCD (Charge Coupled Device) by a lens 15. Thus, a real image is formed on the CCD 16. A portion of the real image formed on an effective width of the CCD 16 is converted into an electric video (picture) signal. The document support 11 supporting the document 12 is horizontally moved relatively (secondary scan) to the lamp 13, the lens 15 and the CCD 16 to obtain the picture signals on the whole surface of the document 12.

The light source 13, the lens 15, the CCD 16 and the mirrors 17 and 18 are mounted on a secondary scanning carriage or support 14 for the secondary scanning. The secondary scanning carriage 14 is so designed as to be movable in the rightward and leftward direction (FIG. 1A). Both ends of a wire 20 are fixed to the secondary scanning carriage 14. The wire 20 is wound on a pair of pulleys 21 and 22. Drive force of a pulse motor 23 as a drive source for the secondary scanning of the image pickup portion is transmitted through the pulley 21 and wire 20 to the secondary scanning carriage 14 to drive the latter in the rightward and leftward directions.

Clock pulses from a clock generator 25 are supplied through a CCD control circuit 26 to the CCD 16 to obtain the video signal from the latter. The output of the CCD is supplied as video signal through a video amplifier 27 to a recording portion of the duplicator.

Figure 3:
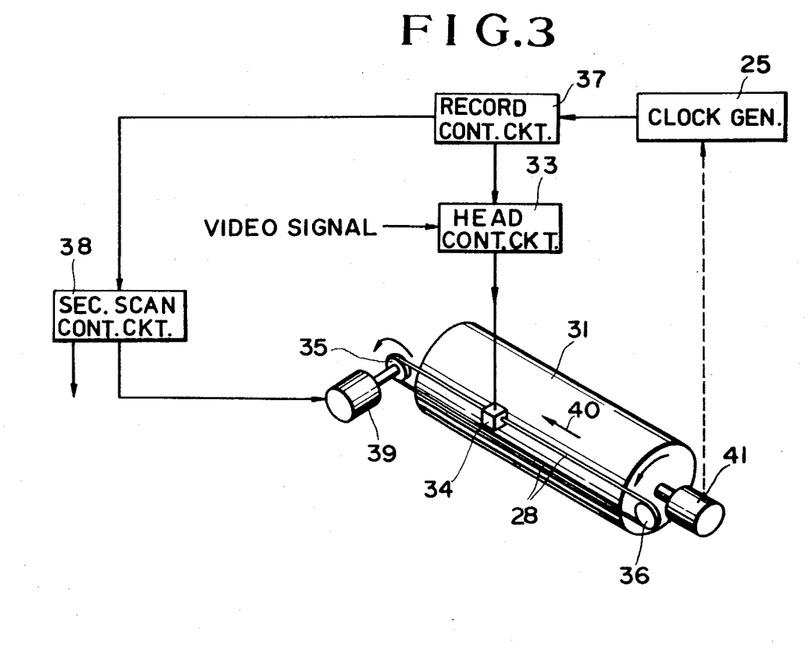
FIG. 3 is a schematic perspective view of a recording drum and a secondary scanning mechanism of the recording portion for explaining the secondary scanning operation in the recording portion of FIG. 1B.

FIG. 1B and FIG. 3 show the recording portion of the duplicator. In FIG. 1B, a magnetic recording drum 31 constituting a magnetic recording medium is rotated in the clockwise direction as shown by the arrow. The picture signal obtained from the video amplifier 27 of the image pick-up portion shown in FIG. 1A is supplied through a recording head control circuit 33 to a multichannel magnetic recording head 32. A magnetic latent image is formed on the recording drum 31 by the magnetic head 32. The magnetic latent image is developed by a toner development device 30.

The magnetic head 32 is mounted on a secondary scanning support 34 for the secndary scanning of the recording portion. The secondary scanning support 34 is so designed as to be movable in the leftward and rightward directions (FIG. 3), namely in the axial direction of the recording drum 31. Both ends of a wire 28 are fixed on the secondary scanning support 34. The wire 28 is wound on the pair of pulleys 35 and 36. A drive force of a pulse motor 39 as a drive source for the secondary scanning of the recording portion is transmitted through the pulley 35 and the belt 28 to the secondary scanning support 34 to drive the latter in the axial direction of the recording drum 31.

A rotary encoder 41 is combined with a rotary shaft of the recording drum 31. The rotary encoder 41 constitutes a part of the clock generator 25 shown in FIG. 1A and FIG. 3. One index pulse is generated per revolution of the recording drum 31 from the rotary encoder 41. Numerous clock pulses are generated between the index pulses.

The index pulse and clock pulses exactly correspond to respective positions on the periphery of the recording drum 31. They are supplied to a recording control circuit 37. The record head control circuit 33 and a secondary scan control circuit 38 are controlled on the basis of the index pulse and clock pulses by the record control circuit 37. The pulse motor 23 as the secondary scan drive source for the image pickup portion and the pulse motor 39 as the secondary scan drive source for the recording portion are controlled by the secondary scan control circuit 38.

On the other hand, referring to FIG. 1B, a record paper 45 is led into a record paper transport path 47 shown by dotted line from a paper supply elevator 48 by a feed roller 46, and it is introduced into the gap between the recording drum 31 and a transfer roller 49 by means of guide rollers (not shown). Paper guide members 51 and 52 are arranged for forming the transport path 47. While the record paper 45 passes between the rcording drum 31 and the transfer drum 49, the toner image is transferred onto the record paper 45. The record paper 45 is further transported along the transport path and the toner image is fixed on the record paper 45 between fixing rollers 55 and 56 of the fixing device. Then, it is discharged into a copy receiver 57. The remaining toner on the recording drum 31 after the above described transferring operation is removed by a cleaning blade 61 and an air accumulator 62 of a cleaning device. The latent image on the recording drum 31 is erased by an erasing head 63 which extends over the whole width of the recording drum 31, before a next latent image is formed on the recording drum 31.

The direction in which the primary scanning in the image pickup portion is effected for the formation of the latent image is in the widthwise direction of the document 12, as shown in FIG. 2, that is, the longitudinal direction of the light source 13, while the direction of the primary scanning in the recording portion is in the peripheral direction of the recording drum 31, as shown in FIG. 1B. One line of the primary scanning is effected in one revolution of the recording drum 31. While one line of the primary scanning for the image pickup and latent image formation is effected, one line of the secondary scanning of the image pickup portion and recording portion is effected. The secondary scanning of the image pickup portion is effected by moving the secondary scanning carriage 14 shown in FIG. 1A in the direction shown by the arrow 19, while the secondary scanning of the recording portion is effected by moving the secondary scanning support 34 shown in FIG. 3 in the direction shown by the arrow 40. The primary scanning direction and the secondary scanning direction are shown in FIG. 2 with respect to the document 12 of A4-size.

The whole surface of the document 12 is scanned by repeating the above primary and secondary scannings. Thus, the magnetic latent image corresponding to the document 12 is formed on the recording drum 31.

Next, there will be described sequential operations of the duplicator shown in FIG. 1 to FIG. 3.

Duplication or copying starts with a copy (duplicating) switch. First, the magnetic latent image on the recording drum 31 is erased by the erasing head 63. Next, the image pick-up portion operates for photoelectric conversion to obtain the picture signal. The picture signal is converted into a magnetic signal, and recorded as the latent image on the recording drum 31. Next, it is checked whether the scanning of the doucment is completed or not. The latent image formation mode is completed with the confirmation of the completion of the scanning of the document. The copy mode follows.

In the copy mode, paper feeding, development, transfer and fixing are effected in order, and a copy of the document is obtained. After the transfer, cleaning of the recording drum 31 is effected in concurrence with the fixing. A series of the paper feeding, development, transferring, fixing, and cleaning is repeated, until copies reach a predetermined or desired number. When a desired number of copies are obtained, the copying operation ends automatically.

Figure 4A:
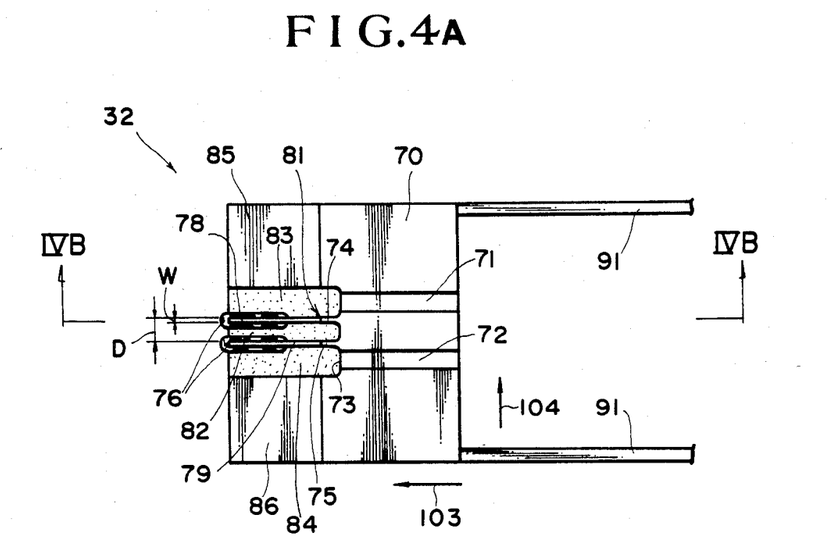
FIG. 4A is a plan view of a two-channel magnetic recording head mechanism shown in FIG. 1B.
Figure 4B:
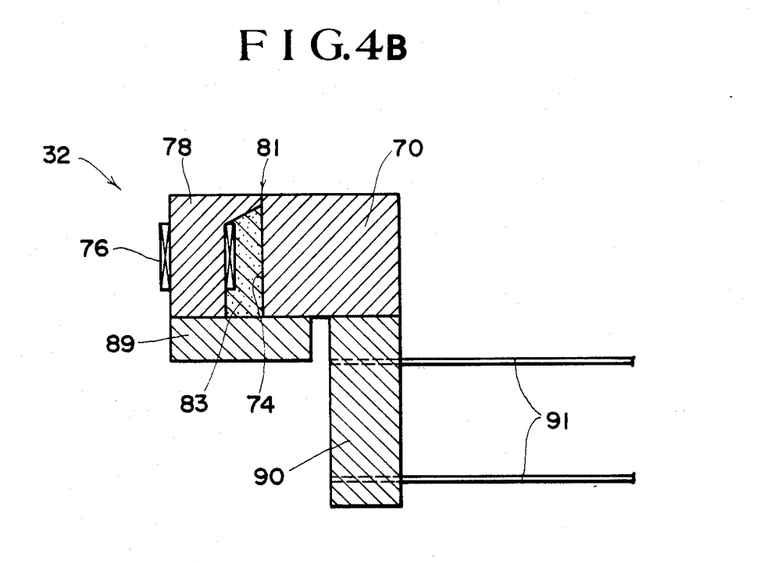
FIG. 4B is a cross sectional view taken along the lines IVB—IVB on FIG. 4A.
Figure 4C:
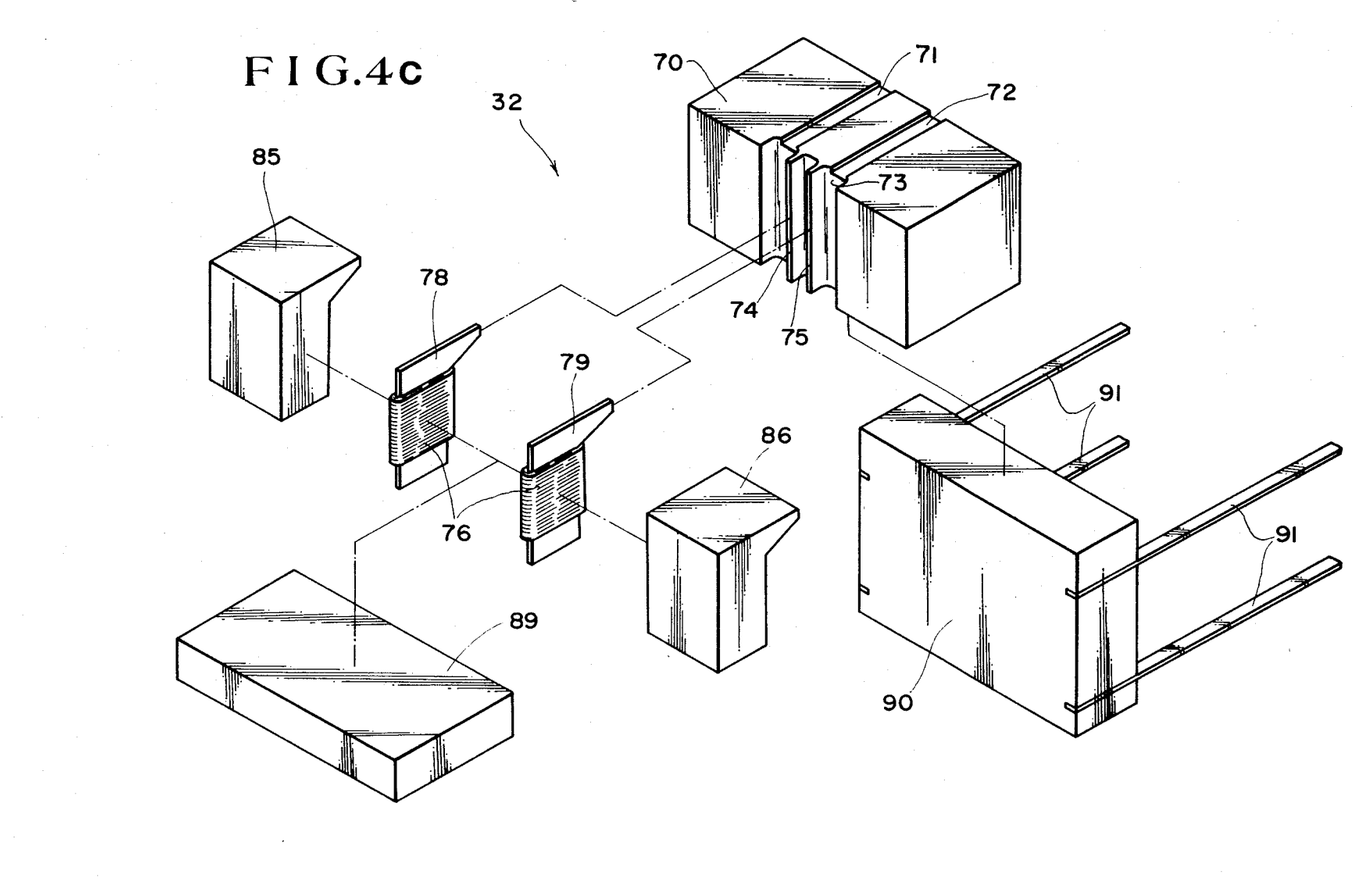
FIG. 4C is an exploded perspective view of the recording head mechanism of FIG. 4A.

FIG. 4A, FIG. 4B and FIG. 4C show a magnetic recording head mechanism which constitutes the multichannel magnetic recording head 32 shown in FIG. 1B. The shown magnetic recording head mechanism 32 is used for a two channel magnetic recording head.

The head mechanism includes a slider 70 which is of a substantially rectangular parallelepiped form. Plural, for example, two parallel grooves 71 and 72 for floating due to dynamic pressure are formed on the upper surface of the slider 70. A shallow recess 73 is formed on one side surface of the slider 70. A pair of ridges 74 and 75 are formed in the recess 73. Upper portions of cores 78 and 79 are abutted to the ridges 74 and 75 so as to form recording gaps 81. Windings 76 for flowing recording currents are wound on the cores 78 and 79, respectively. The space between the cores 78 and 79 is filled with an adhesive 82. Auxiliary sliders 85 and 86 are combined with the cores 78 and 79 by adhesive layers 83 and 84. The auxiliary sliders 85 and 86 have the same profile as the cores 78 and 79. A core block consisting of the cores 78 and 79, adhesive layers 82 to 84 and auxiliary sliders 85 and 86 is combined with the slider 70 by a back plate 89. As occasion demands, spaces among the core block, the back plate 89 and the slider 70 are filled with the adhesive. Further, a core support 90 is fixed on the slider 70. The core support 90 is connected through four leaf springs 91 to a support-access device (not shown) which is fixed on the secondary scanning support 34.

Figure 5:
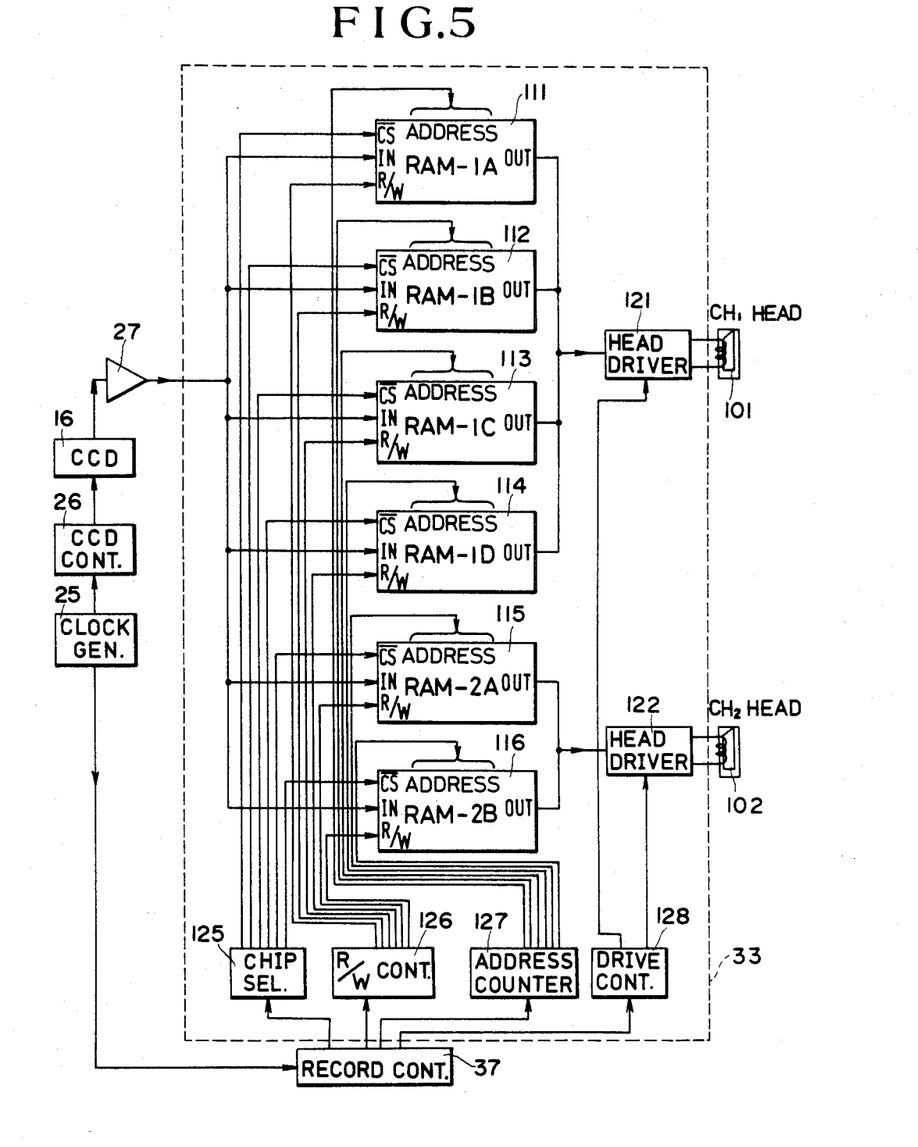
FIG. 5 is a block diagram of a recording head control circuit shown in FIG. 3 and the associated circuits.

The core 78 constitutes a first channel $CH_1$ of the recording head shown at 101 in FIG. 5, while the core 79 constitutes a second channel $CH_2$ of the recording head shown at 102 in FIG. 5. In FIG. 4A, a track width corresponds to W. For example the track may be 0.1 mm wide. Accordingly, a resolving power of the secondary scanning of the recording head mechanism 32 may be 10 lines per mm. In FIG. 4A, D represents a pitch distance between the two tracks and, may be, for example, 0.5 mm in width. Accordingly, the two channels are spaced by 0.4 mm from each other. Cross talk components between the two channels can be reduced to a minimum.

The head mechanism 32 is so arranged adjacent to the recording drum 31 that the grooves 71 and 72 of the slider 70 face to the peripheral surface of the recording drum 31. Accordingly, the recording drum 31 moves along the upper surfaces of the slider 70 and auxiliary sliders 85 and 86 in the direction shown by an arrow 103 in FIG. 4A. The head mechanism 32 moves in the direction shown by another arrow 104 in FIG. 4A with the movement of the secondary scan support 34.

From the viewpoint of yield, the head mechanism 32 shown in FIG. 4A, FIG. 4B and FIG. 4C is practical. The above head block and the slider 70 can be separately manufactured. Accordingly, their portions for constituting the gaps can be so sufficiently ground that they are bonded with the adhesive. Deterioration of copy quality due to misalignment of gaps can be practically avoided.

Figure 6:
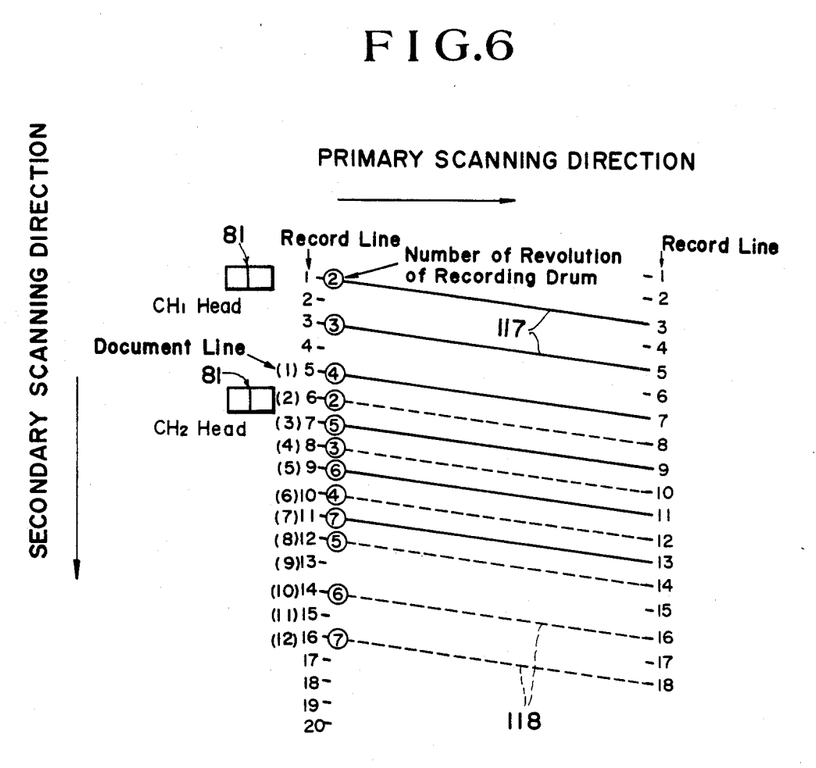
FIG. 6 is a developed view of loci of $CH_1$ head and $CH_2$ head on a recording drum in an early stage of one latent image forming method using the recording head control circuit of FIG. 5.
Figure 7:
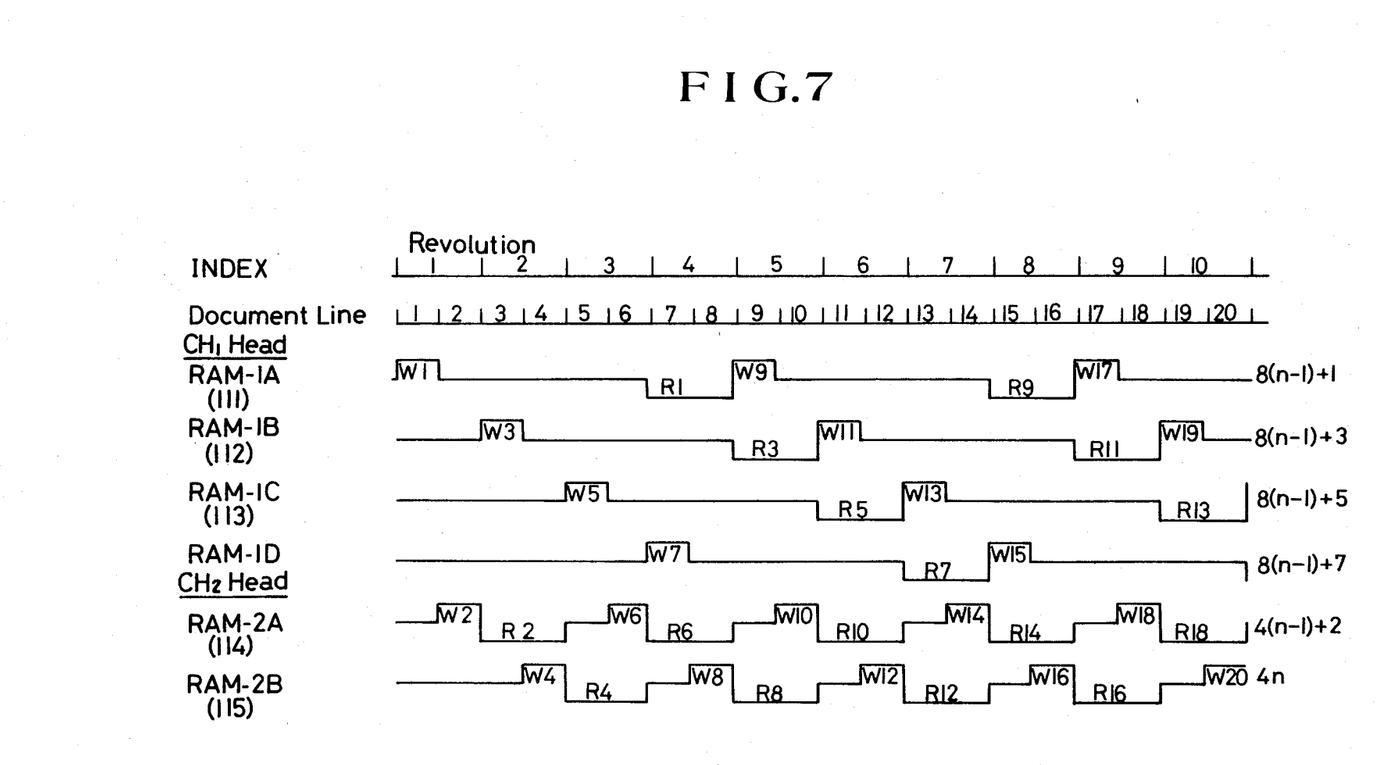
FIG. 7 is a timing chart of the recording head control circuit in the early stage of the one latent image forming method.

FIG. 5 show details of the recording head control circuit 33 shown in FIG. 3 and the circuits associated with the recording head control circuit 33. FIG. 6 shows developed loci of the first channel $CH_1$ and the second channel $CH_2$ of the head 32 on the recording drum 31 in an early stage of one latent image forming method in which the recording head control circuit in FIG. 5 is used. FIG. 7 shows a timing chart of the recording head control circuit 33 in the early stage of the one latent image forming method.

Next, there will be the early stage of the one latent image forming method with reference to FIG. 5, FIG. 6 and FIG. 7.

One index pulse and, for example, 3600 clock pulses per revolution of the recording drum 31 are generated from the clock generator 25 including the rotary encoder 41. The CCD 16 of 1728 bits is driven twice by the 3600 clock pulses. As shown in FIG. 7, the secondary scanning support 14 of the image pickup portion is moved for the two lines of the documemt. During the movement, the video signals are written into memories 111 to 116 such as random access memories (RAMs).

On the other hand, in the recording portion, the video signals for the two lines are as shown in FIG. 6 and FIG. 7, simultaneously read out from two of the memories 111 to 116, and supplied to the channels $CH_1$ and $CH_2$. Thus, latent images for the two lines are simultaneously recorded on the recording drum 31, when the secondary scanning mechanism of the recording portion scans for the two lines.

FIG. 6 is a developed view of the cylindrical recording drum 31 which corresponds to an upper portion of the document of FIG. 2. The length of the primary scanning direction is 210 mm+α, when the width of the document 12 is 210 mm. For example, it is 215 mm. In FIG. 6, left and right numerals not encircled and bracketed represent record secondary scanning lines. The same numerals represent the same position. Leftmost numerals bracketed represent image pickup lines or document lines, and they are smaller by four than the numerals of the corresponding record secondary scanning lines. Left numerals encircled represents the number of revolution of the recording drum 31. Solid lines represent loci of the $CH_1$ head 101. Dotted lines represent loci, of the $CH_2$ head 102.

In FIG. 7 generally Wa means that pickup video signals from the a-th line of the image pickup lines or document lines are written into the corresponding one of the memories or RAMs 111 to 116. For example, $W_1$ means that pickup video signals from the first line of the document 12 are written into the RAM 111. Generally Ra means that the pickup video signals from the a-th line of the image pickup lines or document lines are read out from the corresponding one of the memories or RAMs 111 to 116, and are supplied to the first channel $CH_1$ and second channel $CH_2$. For example, $R_1$ means that the image pickup video signals from the first line of the document 12 are read out from the RAM 111 and are supplied to the head 101.

As shown in FIG. 7, after the rotational speed of the recording drum 31 reaches a predetermined speed, for example, the speed of 3000 r.p.m, for latent image record, the image pickup video signals from the first line of the document 12 are written into the RAM-1A 111 through the video amplifier 27 from the CCD 16 in the first revolution of the recording drum 31. Next, the video-signals from the second line of the document 12 are written into the RAM-2A 115. In the second revolution of the recording drum 31, the image pickup video signals from the third line of the document 12 are written into the RAM-1B 112 ($W_3$ in FIG. 7), and the image pickup video signals from the fourth line of the document 12 are written into the RAM-2B 116 ($W_4$ in FIG. 7). At the same time, as shown in FIG. 6, the first channel $CH_1$ scans from the first record line to the third record line in the secondary scanning direction, while the second channel $CH_2$ scans from the sixth record line to the eighth record line in the secondary scanning direction. The secondary scanning pitch is 0.1 mm/line. Then, the video signals of the second line of the document 12 are read out from the RAM-2A 115 as denoted by $R_2$, and supplied through a head driver 122 to the second channel $CH_2$ of head 32. Thus, the latent image for the second line of the document 12 is recorded on the recording drum 31.

Similarly, in the third revolution of the recording drum 31, the image pickup video signals from the fifth line of the document 12 are written into the RAM-1C 113 ($W_5$ in FIG. 7), and the image pickup video signals from the sixth line of the document 12 are written into the RAM-2A 115 ($W_6$ in FIG. 7). At the same time, the video signals of the fourth line of the document 12 are read out from the RAM-2B 116, and supplied through the head driver 122 to the second channel $CH_2$. Thus, the latent image for the fourth line of the document 12 is recorded on the recording drum 31 ($R_4$ in FIG. 7). As shown in FIG. 6, the first channel $CH_1$ scans from the third record line to the fifth record line, while the second channel $CH_2$ scans from the eighth record line to the tenth record line.

As understood from FIG. 6 and FIG. 7 in the third revolution of the recording drum 31, the first channel $CH_1$ scans from the third record line to the fifth record line. However, no video signal is recorded on the recording drum 31 by the first channel $CH_1$ of head 32. On the other hand, the second channel $CH_2$ scans from the eighth record line to the tenth record line to record the latent image of the fourth line of the document 12 on the recording drum 31.

Next, in the fourth revolution of the recording drum 31 the image pickup video signals from the seventh line of the document 12 are written into the RAM-1D 114 ($W_7$ in FIG. 7), and the image pickup video signals from the eighth line of the codument 12 is written into the RAM-2B 116 ($W_8$ in FIG. 7). At the same time, the image pickup video signals of the first line of the document 12 are read out from the RAM-1A 111 ($R_1$ in FIG. 7), and supplied through a head driver 121 to the $CH_1$ head 101. Thus, the video signals of the first line of the document 12 are recorded as a latent image on the recording drum 31. Further, the video signals of the sixth line of the document 12 are recorded on the recording drum 31 by the second channel $CH_2$ ($R_6$ in FIG. 7). As shown in FIG. 6, the first channel $CH_1$ scans from the fifth record line to the seventh record line to record the video signals of the first line of the document 12 as the latent image on the recording drum 31, while the second channel $CH_2$ scans from the tenth record line to the twelve record line to record the video signals of the sixth line of the document 12 at the latent image on the recording drum 31.

At that time, the latent images of the first and second lines of the document 12 are recorded side by side on the recording drum 31. Since there is no misalignment between the heads channels $CH_1$ and $CH_2$, and the write-in into the RAMs and the read-out from the RAMs are effected with the clock pulses from the rotary encoder 41, the deterioration of the copy quality can be avoided, and a jointless copy can be obtained.

The write-in, read-out and record as shown in FIG. 6 and FIG. 7 are repeated. The spacings between the loci of the first channel $CH_1$ and the second channel $CH_2$ are sequentially filled with the loci of the first channel $CH_1$ and the second channel $CH_2$ to form the latent image without joint on the recording drum 31. On FIG. 6, the video signals of the first line to the eighth line of the document 12 are continuously recorded as the latent image on the recording drum 31.

Figure 8:
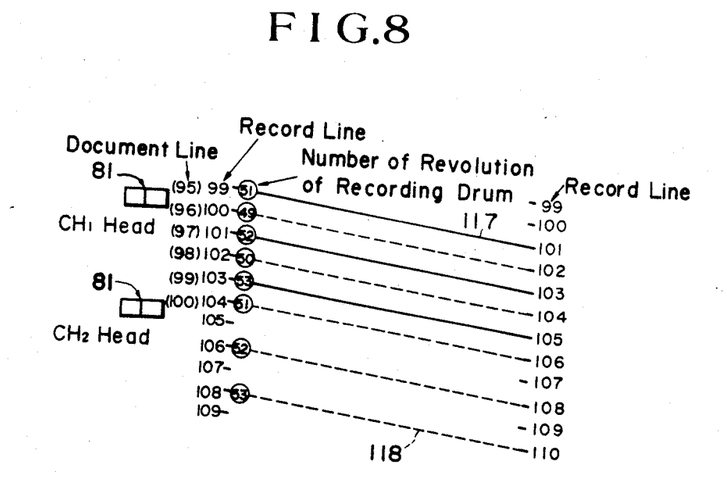
FIG. 8 is a developed view of loci of the CH$_1$ head and CH$_2$ head on the recording drum in a terminal stage of the one latent image forming method.

FIG. 8 shows developed loci of the first channels $CH_1$ and the second channel $CH_2$ on the recording drum 31 in a terminal stage of the one latent image forming method.

Figure 9:
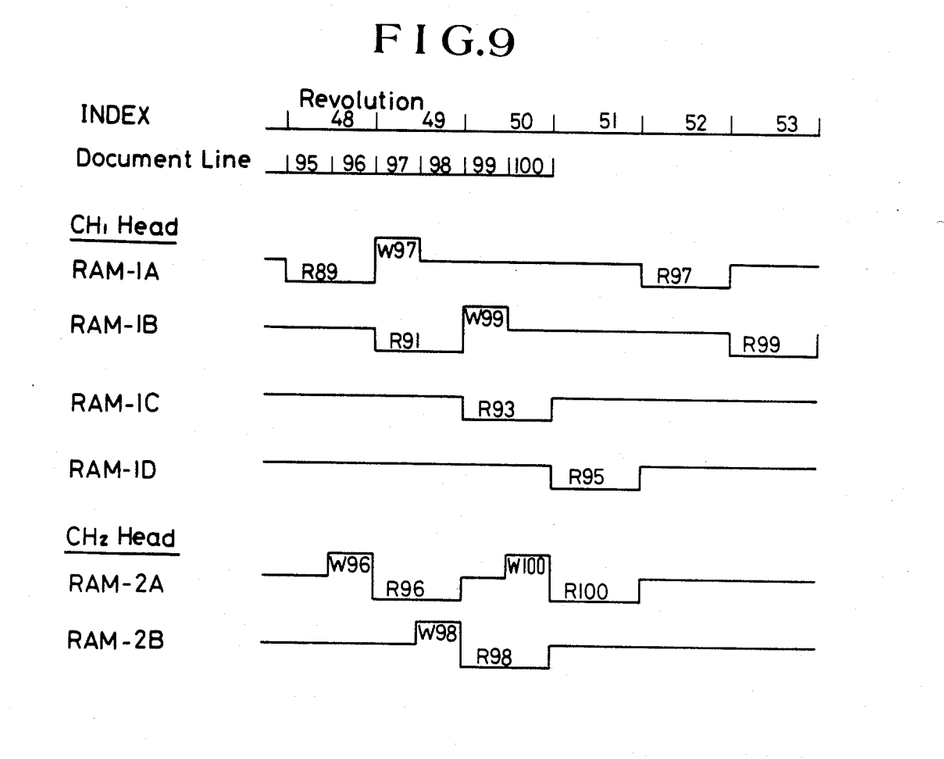
FIG. 9 is a timing chart of the recording head control circuit in the terminal stage of the one latent image forming method.

FIG. 9 shows a timing chart of the recording head control circuit 33 in the terminal stage of the one latent image forming method. For simplifying the drawing, it is assumed that the last line of the document 12 is 100-th line.

Next, there will be described the terminal stage of the one latent image forming method with reference to FIG. 5, FIG. 8 and FIG. 9.

As clear from FIG. 8 and FIG. 9, after the image pickup video signals of the hundredth (last) line of the document 12 are recorded on the recording drum 31 in the 51-st revolution of the recording drum 31 by the second channel $CH_2$ no video signal is supplied to the second channel $CH_2$. On the other hand, the spacings between the loci of the first channel $CH_1$ and the second channel $CH_2$ are filled with the loci of the first channel $CH_1$. In the 53rd revolution of the recording drum 31, the video signals of the 99-th line of the document 92 are recorded on the recording drum 31. Thus, the video signals of the hundred lines of the document 12 have been recorded as the latent image on the recording drum 31.

Referring to FIG. 5, a chip selecting circuit 125, a read-out/write-in control circuit 126 and an address counter 127 are connected to chip selecting terminals $\overline{CS}$, read-out/write-in terminals R/W and address terminals ADDRESS of the RAMs 111 to 116, respectively, to control the RAMs 111 to 116. The output signals of the clock generator 25 are supplied to the record control circuit 37. The chip selecting circuit 125, the read-out/write-in control circuit 126, the address counter 127 and a drive control circuit 128 are controlled with the record control circuit 37. Further, the secondary scan control circuit 38, as already described, is controlled with the record control circuit 37.

The first channel $CH_1$ works for recording the video signals of the odd lines $\{2(n-1)+1:n=\text{integer}\{$ of the documents, while the second channel $CH_2$ works for recording the video signals of the even lines 2n of the document. This idea can be expanded as follows: When a three-channel recording head is used, a first channel works for recording video signals of lines $\{3(n-1)+2\}$ of the document, a second channel works for recording video signals of lines $\{3(n-1)+2\}$ of the document and a third channel works for recording video signals of lines 3n of the document. When a four or more-channel recording head is used, the same idea can be applied.

With respect to the memories, the RAM-1A works for the video signals of lines $\{8(n-1)+1\{$ of the document, the RAM-1B works for the video signals of lines $\{8(n-1)+3\}$ of the document, the RAM-1C works for the video signals of lines $\{8(n-1)+5\}$ of the document, the RAM-1D works for the video signals of lines $\{8(n-1)+7\}$ of the document, the RAM-2A works for the video signal of lines $\{4(n-1)+2\}$ of the document, and the RAM-2B works for the video signals of lines 4n of the document. This idea may be expanded to a three or more-channel recording head.

The channels $CH_1$ and $CH_2$ scan in skew on the recording drum 31. The secondary scanning length for one line is, for example, 0.1 mm. Accordingly, the length between both ends of the skew scanning line for two lines of the document in the secondary scanning direction is 0.2 mm. Although the line is inclined by 0.2 mm in the recording paper, the copy obtained is not noticeably unnatural.

In the above described method, the loci of the channels $CH_1$ and $CH_2$ are spiral, as shown in FIG. 6 and FIG. 8. However, they may be stepwise. Further, the secondary scan drive sources 23 and 39 may be pulse motors, servo motors, synchronous motors or interconnecting mechanisms for transmitting rotation of the recording drum 31 to the secondary scanning supports 14 and 34. The shape of the locus of the recording head slightly depends on the kind of the secondary scan drive sources 23 and 39. However, the same results can be obtained irrespective of the kind of the secondary scan drive sources 23 and 39.

Next, there will be described another latent image forming method different from the above latent image forming method described with reference to FIG. 5 to FIG. 9, with reference to FIG. 10 and FIG. 11.

Figure 10:
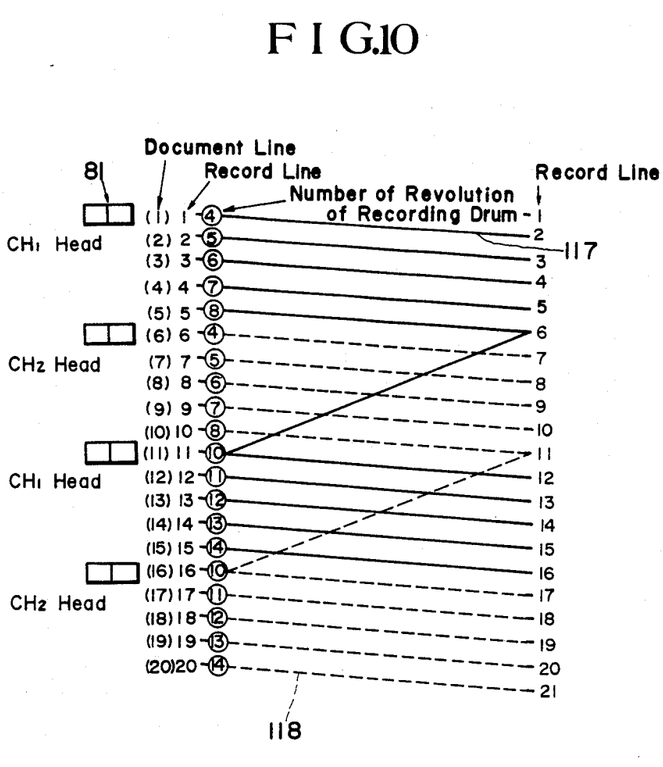
FIG. 10 is a developed view of loci of the CH$_1$ head and CH$_2$ head on the recording drum in an early stage of another latent image forming method.

FIG. 10 shows developed loci of the first channel $CH_1$ and the second channel $CH_2$ on the recording drum 31 in an early stage of the other latent image forming method. FIG. 11 is a timing chart of the recording head control circuit over the whole period of the other latent image forming method.

Figure 11:
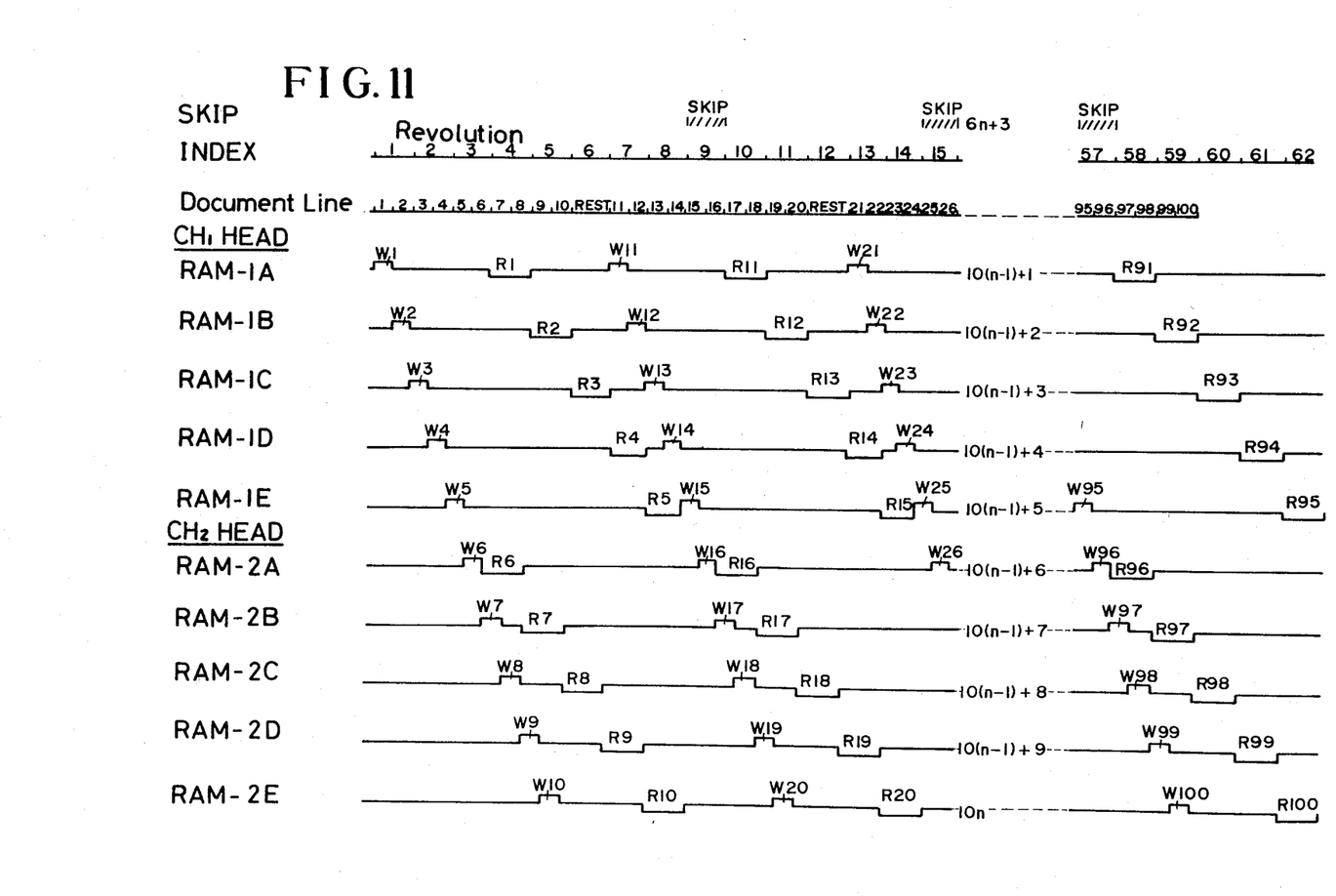
FIG. 11 is a timing chart of recording head control circuit in the whole period of the other latent image forming method.

As understood from FIG. 10 and FIG. 11, after the rotation of the recording drum 31 reaches the predetermined speed for recording latent image, the image pickup video signals from the first line of the document 12 are written into the RAM-1A ($W_1$ in FIG. 11), and the image pickup video signals from the second line of the document 12 are written into the RAM-1B ($W_2$ in FIG. 11), in the first revolution of the recording drum 31. Next, in the second revolution of the recording drum 31, the image pickup signals from the third line of the document 12 are written into the RAM-1C ($W_3$ in FIG. 11), and the image pickup signals from the fourth line of the document 12 are written into the RAM-1D ($W_4$ in FIG. 11). Similarly, in the third revolution of the recording drum 31, the image pickup video signals from the fifth and sixth lines of the documents 12 are written into the RAM-1E and RAM-2A ($W_5$ and $W_6$ in FIG. 11). In the fourth revolution of the recording drum 31, the video signals written as $W_1$ are read out from the RAM-1A ($R_1$ in FIG. 11) and supplied to the first channel $CH_1$ to be recorded as latent image on the recording drum 31. At the same time, the video signals written as $W_6$, are read out from the RAM-2A ($R_6$ in FIG. 11), and supplied to the second channel $CH_2$ to be recorded as latent image on the recording drum 31. Further, the image pickup video signals from the seventh line of the document 12 are written into the RAM-2B ($W_7$ in FIG. 11), and the image pickup video signals from the eighth line of the document 12 are written into the RAM-2C ($W_8$ in FIG. 11). It is to be noted that the secondary scanning mechanism of the recording portion does not operate in the initial three revolutions of the recording drum 31, although the video signals from the six lines of the document 12 are written into the RAMs-1A, 1B, 1C, 1D, 1E and 2A, respectively, no recording current flows into the recording heads 101 and 102, and that the secondary scanning mechanism of the recording portion starts to operate first in the fourth revolution of the recording drum 31, and recording currents start to flow into the recording heads 101 and 102.

The subsequent operations will be understood from the comparison of the head loci of FIG. 10 with the timing chart of FIG. 11. In the sixth revolution of the recording drum 31, the image pickup rests. During that time, the video signals of the third line of the document 12 are read out from the RAM-1C ($R_3$ in FIG. 11), and supplied to the first channel $CH_1$ to be recorded as latent image on the recording drum 31. At the same time, the video signals of the eighth line of the document 12 are read out from the RAM-2C ($R_8$ in FIG. 11), and supplied to the second channel $CH_2$ to be recorded on the recording drum 31. As shown in FIG. 10, the locus of the first channel $CH_1$ in the eighth revolution of the recording drum 31 adjoins the locus of the second channel $CH_2$ in the fourth revolution of the recording drum 31. Thus, the video signals of the first to tenth lines of the document 12 have been recorded as the latent image on the first to tenth record lines of the recording drum 31. Next, in the ninth revolution of the recording drum 31, the first channel $CH_1$ and the second channel $CH_2$ skip from the terminal positions of the sixth and eleventh record lines to the initial positions of the eleventh and sixteenth record lines, respectively. Thus, the first channel $CH_1$ and the second channel $CH_2$ come to the record zone of the lower half of FIG. 10. During the skipping period, the writing operation continues, but the recording operation stops. The RAM-1A works for the [10(n−1)+1]-th lines of the document 12. The RAM-1B works for the [10(n−1)+2]-th lines of the document 12. The RAM-1C works for the [10(n−1)+3]-th lines of the document 12. The RAM-1D works for the [10(n−1)+4]-th lines of the document 12. And the RAM-1E works for the

[10(n−1)+5]-th lines of the document 12. The video signals of these lines of the document 12 are read out from the RAMs -1A, -1B, -1C, -1D and -1E, and supplied to the first channel CH₁ to be recorded on the recording drum 31. Similarly, the RAM-2A works for the [10(n−1)+6]-th lines of the document 12. The RAM-2B works for the [10(n−1)+7]-th lines of the document 12. The RAM-2C works for the [10(n−1)+8]-th lines of the document 12. The RAM-2D works for the [10(n−1)+9]-th lines of the document 12. And the RAM-2E works for the 10n-th lines of the document 12. The video signals of these lines of the document 12 are read out from the RAMs-2A, -2B, -2C and -2E, and supplied to the second channel CH₂ to be recorded on the recording drum 31.

It will be easily understood that a recording head control circuit for the operations of FIG. 10 and FIG. 11 can be obtained in such a manner that several RAMs are added to the recording head control circuit of FIG. 5. Accordingly, the recording head control circuit for the operations of FIG. 10 and FIG. 11 are not shown.

The terminal stage of the latent image forming operation is shown in the right hand of FIG. 11. The writing operation or image pickup operation stops at the fifty ninth revolution of the recording drum 31. And the read-out operation or recording operation stops at the sixty second revolution of the recording drum 31.

It is to be noted in FIG. 7, FIG. 9 and FIG. 11 that the time to write the video signals into the RAM is half of the time to read out the video signals from the RAM, since the CCD 16 for one line is used for the two-channel magnetic record head. For example, 3600 clock pulses per revolution of the recording drum 31 are used as the clock pulses for driving the CCD 16, namely for writing the video signals into the memory, and 1800 clock pulses per revolution of the recording drum 31 are used for reading out the video signals from the memory.

While the preferred embodiment has been described, variations thereto will occur to those skilled in the art within the scope of the present inventive concepts which are delineated by the following claims. For example, in the above embodiment, a two-channel magnetic head mechanism is used as the magnetic recording head. However, two or more one-channel magnetic heads may be used for a magnetic recording head. In that case, the spacing between tracks is still larger than the spacing in the above embodiment, and it is preferable that a delay circuit for adjusting alignment of head gaps is included in the recording control circuit 37. Further, a shielding core may be arranged between the cores in the two-channel head.

In the above embodiment, the two-channel head is used for one image pickup element, namely the CCD 16. However, when the numbers of image pickup elements are equal to the number of channels of a recording head, the memories do not always need to be used. In that case, lines of the document to be recorded by the respective channels of the recording head may be picked up by the corresponding image pickup elements.

Further, this invention is not limited to the numerical values used in the above described embodiment.

The basic technical concept of this invention consists in that plural heads spaced by a predetermined length (D in FIG. 4A) from each other are used, and the latent image forming operation is so controlled as to fill the spacing with head loci.

Further in the above embodiment, a generating source for the video signals is an optical read-out means. However, this invention is not limited to such means. It may be input data from a computor or a facsimile machine.

What is claimed is:

1. A magnetic printing machine including a rotatable magnetic recording drum and a magnetic recording head arranged to be moved along the axial direction of said magnetic recording drum and fed with video signals to be processed, in which a first relative movement between said magnetic recording drum and said magnetic recording head in the peripheral direction of said magnetic recording drum is effected as a primary scanning, and a second movement between said magnetic recording drum and said magnetic recording head along the axial direction of said magnetic recording drum is effected as a secondary scanning; said machine comprising:

(A) a plurality of channels carried by said head, said channels being separated by a distance equal to a predetermined record line pitch multiplied by an integer $P(P \geq 3)$, said record line pitch being defined as the distance traveled by one channel of said head in said secondary scanning direction during each revolution of said drum; and (B) means for effecting said secondary scanning such that said magnetic recording head is moved along the axial direction of said magnetic recording drum a distance defined by the product of said predetermined record line pitch multiplied by the number of said channels of said magnetic recording head for each revolution of said drum.

2. The machine according to claim 1, in which light from a document is converted to electrical video signals by photoelectric converting means, and said electrical video signals are supplied to said magnetic recording head.

3. The machine according to claim 2, in which said photoelectric converting means comprises a Charge-Coupled Device (CCD).

4. The machine according to claim 1, in which said magnetic recording head includes a first channel and a second channel, said machine further comprising:

one photoelectric converting element, two video signals being read out from said photoelectric converting element per one revolution of said magnetic recording drum;

a first memory, the first of said video signals read out from said photoelectric converting element being written into said memory for said first channel;

a second memory, the second of said video signals read out from said photoelectric converting element being written into said second memory for said second channel;

a third memory for said first channel, video signals previously written being read out from said third memory during said one revolution of said magnetic recording drum and supplied to said first channel; and a fourth memory for said second channel, said video signals previously written being read out from said fourth memory during said one revolution of said magnetic recording drum and supplied to said second channel.

5. The machine according to claim 1, further comprising a developing means for supplying a magnetic toner onto said surface of said magnetic recording drum to develop said magnetic latent image formed by said magnetic recording head; a transporting means for running a recording paper along a predetermined transport path; a transfer means for transfering the toner image on said surface of the magnetic recording drum onto said recording paper running; a fixing means for fixing said transferred toner on said recording paper; and a cleaning means for cleaning the remaining toner on said surface of the magnetic recording drum after the transfer.

6. The machine according to claim 5, in which said machine includes a magnetic erase head extending substantially over the whole width of said magnetic recording drum along its axial direction to erase the magnetic latent image formed on the surface of said magnetic recording drum.

7. The machine according to claim 1, in which said control means includes memory means, and said video signals are written into said memory means, are read out from said memory means at a predetermined timing, and are supplied to at least one channel of said magnetic recording head.

8. The device according to claim 7 in which said control means includes a rotary encoder combined with the rotational shaft of said magnetic recording drum, said timing being generated by said rotary encoder which encoder generates one index pulse per one revolution of said drum.

9. The machine according to claim 7, in which said memory means comprises a Random Access Memory (RAM).

10. A magnetic printing machine including a rotatable magnetic recording drum and a magnetic recording head arranged to be moved along the axial direction of said magnetic recording drum and fed with video signals to be processed, in which a first relative movement between said magnetic recording drum and said magnetic recording head in the peripheral direction of said magnetic recording drum is effected as a primary scanning, and a second movement between said magnetic recording drum and said magnetic recording head along the axial direction of said magnetic recording drum is effected as a secondary scanning; said machine comprising:

(A) a number of channels each carried by said magnetic recording head, said channels being arranged with a pitch equal to the product of a predetermined record line pitch and an integer $P(P \geq 3)$, said record line pitch being defined as the distance traveled by one channel of said head in said secondary scanning direction during each revolution of said drum; and (B) means for effecting said secondary scanning such that;
 (1) said magnetic recording head is first moved along the axial direction of said drum a distance equal to the product of said predetermined record line pitch and said integer P in such a manner that said magnetic recording head is moved a distance equal to said predetermined record line pitch for each revolution of said drum; and
 (2) thereafter, said magnetic recording head is moved along the axial direction of said drum a distance equal to the product of said record line pitch and a multiple, said multiple being defined as the product of said integer P and one less than said number of channels.

11. The device according to claim 10, in which said magnetic recording head consists of a first channel and a second channel, said machine further including one photoelectric converting element for converting light from a document to electric video signals, a plurality of video signals being read out from said photoelectirc converting element per one revolution of said magnetic recording drum, the first P groups of said video signals being read out from said photoelectric converting element and sequentially written into P memories for said first channel, the second P groups of said video signals being read out from said photoelectric converting element and sequentially written into P memories for said second channel, and said video signals previously written being read out simultaneously from respective ones of said memories for said first and second channel in said one revolution of said magnetic recording drum and supplied to said first and second channels.

* * * * *